(12) United States Patent
Goo (10) Patent No.: US 12,401,258 B2
(45) Date of Patent: Aug. 26, 2025

(54) APPARATUS FOR OPERATING SIMULTANEOUSLY AS DC (DIRECT CURRENT) MOTOR AND DC GENERATOR

(71) Applicant: Jei Hyun Goo, Seoul (KR)

(72) Inventor: Jei Hyun Goo, Seoul (KR)

( * ) Notice: Subject to any disclaimer, the term of this patent is extended or adjusted under 35 U.S.C. 154(b) by 0 days.

(21) Appl. No.: 18/703,720

(22) PCT Filed: Jun. 27, 2022

(86) PCT No.: PCT/KR2022/009089
§ 371 (c)(1),
(2) Date: Apr. 23, 2024

(87) PCT Pub. No.: WO2023/075073
PCT Pub. Date: May 4, 2023

(65) Prior Publication Data
US 2024/0348137 A1    Oct. 17, 2024

(30) Foreign Application Priority Data
Oct. 26, 2021 (KR) .......................... 10-2021-0144053

(51) Int. Cl.
*H02K 23/52* (2006.01)
*H02J 7/14* (2006.01)
(Continued)

(52) U.S. Cl.
CPC ............ *H02K 23/52* (2013.01); *H02J 7/1415* (2013.01); *H02K 3/28* (2013.01); *H02K 11/22* (2016.01);
(Continued)

(58) Field of Classification Search
CPC .......... H02K 23/52; H02K 3/28; H02K 11/22; H02K 11/33; H02K 21/145; H02K 21/24;
(Continued)

(56) References Cited

U.S. PATENT DOCUMENTS 3,247,407 A * 4/1966 Bruneel ................. H02K 53/00
310/155
4,011,487 A * 3/1977 Loomis ..................... H02P 6/30
318/400.4
(Continued)

FOREIGN PATENT DOCUMENTS

CN    114465375 A  *  5/2022  ........... H02K 1/2753
TW    1811012 B      6/2022
(Continued)

*Primary Examiner* — Pedro J Cuevas
(74) *Attorney, Agent, or Firm* — Jose Cherson Weissbrot (57) ABSTRACT

An apparatus for operating simultaneously as DC (Direct Current) motor and DC generator is disclosed. Four permanent magnets (101, 102, 103, 104) are placed to be able to rotate with a shaft and two coils (201, 202) are placed outside the circumference of the permanent magnets and one secondary cell battery (301) is used to supply electric current to the coils. One device (501) for making electric current flow alternately in the coils is placed. If electric current flows in a first coil (201) by the secondary cell battery, the shaft rotates and the rotating permanent magnets generate electric power in a second coil (202). Electric current flows from the second coil to the first coil. Electric current always flows in one direction in the coils as the shaft rotates in one direction.

8 Claims, 10 Drawing Sheets

(51) Int. Cl.
*H02K 3/28* (2006.01)
*H02K 11/22* (2016.01)
*H02K 11/33* (2016.01)
*H02K 21/14* (2006.01)
*H02K 21/24* (2006.01)
*H02K 29/10* (2006.01)
*H02K 53/00* (2006.01)

(52) U.S. Cl.
CPC .......... *H02K 11/33* (2016.01); *H02K 21/145* (2013.01); *H02K 21/24* (2013.01); *H02K 29/10* (2013.01); *H02K 53/00* (2013.01)

(58) Field of Classification Search
CPC ........ H02K 29/10; H02K 21/14; H02K 21/12; H02K 53/00; H02P 6/16
See application file for complete search history.

(56) References Cited

U.S. PATENT DOCUMENTS

| | | | | |
|---|---|---|---|---|
| 4,266,180 A * | 5/1981 | Juvan | ............... | H02K 39/00 310/43 |
| 4,357,551 A * | 11/1982 | Dulondel | ............ | H02K 25/00 310/46 |
| 4,733,099 A * | 3/1988 | Hutson, Jr. | ......... | H02K 53/00 290/1 R |
| 5,177,393 A | 1/1993 | Webber | | |
| 5,585,680 A * | 12/1996 | Tsoffka | ................ | H02K 37/10 310/154.29 |
| 6,759,775 B2 * | 7/2004 | Grimm | ................ | H02K 53/00 310/156.01 |
| 7,064,513 B2 * | 6/2006 | Fenley | ................ | F02D 41/083 318/700 |
| 7,148,596 B2 * | 12/2006 | Minato | ................ | H02K 53/00 310/152 |
| 7,235,909 B2 * | 6/2007 | Moe | .................. | H02K 53/00 310/152 |
| 7,719,225 B2 * | 5/2010 | Nomura | .............. | H04N 23/68 348/208.99 |
| 8,089,187 B2 * | 1/2012 | Budde | ................. | H02P 25/16 310/152 |
| 9,906,116 B2 * | 2/2018 | Knapp | ................. | H02K 53/00 |
| 10,122,305 B2 * | 11/2018 | Sakaguchi | ......... | H02P 25/0925 |
| 10,566,887 B2 * | 2/2020 | Goo | ...................... | H01F 7/06 |
| 10,742,103 B2 * | 8/2020 | Goo | ...................... | H02K 21/12 |
| 2003/0151323 A1 * | 8/2003 | Grimm | ................. | H02K 21/12 310/156.01 |
| 2005/0023916 A1 * | 2/2005 | Moe | ..................... | H02K 99/00 310/103 |
| 2005/0073279 A1 * | 4/2005 | Fenley | ................ | H02P 6/15 318/717 |
| 2005/0184613 A1 * | 8/2005 | Minato | ................ | H02K 53/00 310/113 |
| 2006/0170388 A1 * | 8/2006 | Nomura | .............. | H04N 23/651 348/E5.025 |
| 2007/0210665 A1 * | 9/2007 | Moe | ..................... | H02K 99/00 310/180 |
| 2007/0228856 A1 * | 10/2007 | Bates | ................... | H02K 53/00 310/46 |
| 2009/0236922 A1 * | 9/2009 | Budde | ................. | H02P 25/16 310/152 |
| 2012/0280588 A1 * | 11/2012 | Bryson | ................ | H02K 53/00 74/DIG. 9 |
| 2018/0054143 A1 * | 2/2018 | Sakaguchi | ............ | H02P 1/163 |
| 2019/0238036 A1 * | 8/2019 | Goo | ...................... | H01F 7/14 |
| 2019/0238037 A1 * | 8/2019 | Goo | ...................... | H02P 7/04 |

FOREIGN PATENT DOCUMENTS

| | | | | |
|---|---|---|---|---|
| WO | WO-2020011563 A1 * | 1/2020 | ............ | H02K 21/12 |
| WO | 2020145518 A1 | 7/2020 | | |
| WO | WO-2023035039 A1 * | 3/2023 | | |

* cited by examiner

APPARATUS FOR OPERATING SIMULTANEOUSLY AS DC (DIRECT CURRENT) MOTOR AND DC GENERATOR

TECHNICAL FIELD

The present invention relates to an apparatus for operating simultaneously as DC (Direct Current) motor and DC generator. Four permanent magnets are placed to be able to rotate with a shaft and two coils are placed outside the circumference of the permanent magnets and one secondary cell battery is used to supply electric current to the coils. One device for making electric current flow alternately in the coils is placed. If electric current flows in a first coil by the secondary cell battery, the shaft rotates and the rotating permanent magnets generate electric power in a second coil. Electric current flows from the second coil to the first coil. Electric current always flows in one direction in the coils as the shaft rotates in one direction.

BACKGROUND ART

In an electronic circuit using a relay, a transistor which is used as a switch is connected to a terminal of the relay and the transistor is connected to the negative side of a battery. As the battery is connected to the relay and disconnected, a voltage higher than the battery voltage occurs momentarily to the relay. This occurred voltage damages the transistor. In order to solve this problem, a diode is used in which the anode of the diode is connected to the relay of which one terminal is connected to the negative side of the battery and the cathode of the diode is connected to the relay of which other terminal is connected to the positive side of the battery. By doing this, the electricity that occurs to the relay flows from the anode of the diode to the cathode of it. In other words, a high voltage occurs momentarily to the relay of which the terminal is disconnected from the negative side of the battery and so electrons at the relay of which the terminal is connected to the positive side of the battery flow from the cathode of the diode to the anode of it and flow to the relay. The occurred high voltage to the relay is back-emf that occurs to the relay as the battery is connected to the relay and disconnected.

As a battery is connected to a coil, electrons flow from the negative terminal of the battery to the positive terminal of the battery. As the coil is disconnected from the negative terminal of the battery, electrons do not flow anymore from the negative terminal of the battery to the coil and electrons continue to flow to the positive terminal of the battery and electrons in the coil continue to move forward by the magnetic force of the coil. Within the coil, electrons start to disappear from the terminal which is disconnected from the negative terminal of the battery. Therefore, the number of electrons in the side which is connected to the positive terminal of the battery and the number of electrons in the side which is disconnected from the negative terminal of the battery are different and the difference changes. The difference in the number of electrons of two sides becomes bigger and then becomes smaller. The difference in the number of electrons which occurs in the coil is back-emf. The back-emf becomes bigger and reaches its peak as the difference in the number of electrons of two sides is largest (that is, as electrons exist only in one half of the coil). And then it becomes smaller and disappears.

The voltage of one coil becomes higher than the voltage of one secondary cell battery instantly by back-emf which occurs to the coil as the secondary cell battery is disconnected from the coil. If both the positive terminal and the negative terminal of the secondary cell battery are disconnected from both terminals of the coil, the coil becomes a power source instantly and the terminal (terminal $1b$) which is disconnected from the negative terminal of the secondary cell battery becomes the positive terminal and the terminal (terminal $1a$) which is disconnected from the positive terminal of the secondary cell battery becomes the negative terminal. If the terminal $1a$ of the coil is connected to one terminal (terminal $2a$) of another (second) coil and another terminal (terminal $2b$) of the second coil is connected to the terminal $1b$ of the coil, then electrons flow from the terminal $1a$ of the coil to the terminal $2a$ of the second coil and flow from the terminal $2b$ of the second coil to the terminal $1b$ of the coil.

By doing this, electrons circulate in the coils by the back-emf which occurs to the coil and the coil activates and the power consumption of the secondary cell battery is reduced.

U.S. Pat. No. 6,777,838 B2 (17 Aug. 2004) discloses a method of increasing the power output of existing permanent magnet motors. Increased power output is achieved by more completely utilizing the magnetic field of motor permanent magnets during running. The apparatus is external to the motor and therefore eliminates the need for modifications to the motor itself. Photointerrupters, Hall effect sensors, FETs, and two sets of batteries are used to utilize back-emf. As back-emf occurs to an electromagnet, electrons flow from the positive terminal of one set of batteries to one terminal of the electromagnet and flow from another terminal of the electromagnet to the positive terminal of another set of batteries.

In WO 2015/142084 A1 (24 Sep. 2015), the negative terminal of a secondary cell battery is disconnected from an electromagnet. Electrons which flowed to the electromagnet continue to flow to the positive terminal of the secondary cell battery as the electromagnet is disconnected from the negative terminal of the secondary cell battery. By back-emf which occurs to the electromagnet, electrons in a capacitor flow to the electromagnet and also electrons flow from the positive terminal of the secondary cell battery to the capacitor and the electromagnet. The electrons which flowed to the electromagnet continue to flow to the positive terminal of the secondary cell battery.

In WO 2018/236072 A2 (27 Dec. 2018), an apparatus which rotates a shaft by using one electromagnet is disclosed. Permanent magnets are placed around a shaft to rotate with the shaft and an electromagnet is placed outside the circumference of the permanent magnets and one device of activating electromagnet is placed. Two secondary cell batteries are used to activate the electromagnet and the electromagnet makes the permanent magnets rotate. The secondary cell batteries are charged by using back-emf which occurs to the electromagnet.

In WO 2020/145518 A1 (16 Jul. 2020), an apparatus for operating as DC (Direct Current) generator and DC motor is disclosed. Two permanent magnets are placed to be able to rotate with a shaft and one coil is placed outside the circumference of the permanent magnets and two secondary cell batteries are connected to the coil. If the shaft rotates without using the secondary cell batteries, the secondary cell batteries are charged by the rotating permanent magnets. One device of making electric current flow in the coil is placed and the secondary cell batteries are used to supply electric current to the coil. The secondary cell batteries are charged by using back-emf which occurs to the coil.

DISCLOSURE OF INVENTION

Technical Problem

The purpose of the present invention is, by using four permanent magnets and two coils and one secondary cell battery, to rotate a shaft by a first coil and to generate electric power in a second coil simultaneously. Also, it is to make electric current flow from the second coil to the first coil, and so to reduce the power consumption of the secondary cell battery.

Solution to Problem

In order to achieve the above purpose, the present invention comprises:
   four permanent magnets which are placed to be able to rotate with a shaft wherein a first permanent magnet, a second permanent magnet, a third permanent magnet, a fourth permanent magnet are placed in order by 90° of angular separation, and the permanent magnets are placed in alternating polarity;
   two coils which are placed outside the circumference of the permanent magnets wherein one side of a first coil faces the first permanent magnet, another side of the first coil faces the second permanent magnet, one side of a second coil faces the third permanent magnet, another side of the second coil faces the fourth permanent magnet, the coils are wound in the same way and placed in the same way, a first terminal ($1a$) of the first coil is connected to a first terminal ($2a$) of the second coil, a second terminal ($2b$) of the second coil is connected to a second terminal ($1b$) of the first coil;
   one secondary cell battery which is used to supply electric current to the coils;
   a rotating component which is placed on the shaft and is configured to repeatedly pass and block light of photointerrupters;
   a device for making electric current flow in the coils, wherein the positive terminal of the secondary cell battery and the first terminal of the first coil are connected by a first P channel FET, the second terminal of the first coil and the negative terminal of the secondary cell battery are connected by a first N channel FET, the positive terminal of the secondary cell battery and the second terminal of the second coil are connected by a second P channel FET, the first terminal of the second coil and the negative terminal of the secondary cell battery are connected by a second N channel FET,
   wherein a FET is configured to be set to turn-on as the light of a photointerrupter is passed and the FET is configured to be set to turn-off as the light of the photointerrupter is
   wherein the first P channel FET and the first N channel FET are configured to be set to turn-on to make electric current flow in the first coil at a position where the first permanent magnet and the second permanent magnet start to face the sides of the first coil, and also where the third permanent magnet and the fourth permanent magnet start to face the sides of the first coil,
   wherein the second P channel FET and the second N channel FET are configured to be set to turn-on to make electric current flow in the second coil at a position where the second permanent magnet and the third permanent magnet start to face the sides of the second coil, and also where the fourth permanent magnet and the first permanent magnet start to face the sides of the second coil,
   wherein the following routines A and B are alternately performed as the rotating component rotates,
   routine A: 1) both the first P channel FET and the first N channel FET are turned on, so that the first coil is activated by the secondary cell battery, the shaft rotates, the rotating permanent magnets generate electric power in the second coil, and
   2) both the first P channel FET and the first N channel FET are turned off, so that electrons flow from the second terminal of the second coil to the second terminal of the first coil and circulate in the coils, and
   wherein the routine A is repeated as the first permanent magnet and the second permanent magnet face the sides of the first coil and also as the third permanent magnet and the fourth permanent magnet face the sides of the first coil, and
   routine B: 1) both the second P channel FET and the second N channel FET are turned on, so that the second coil is activated by the secondary cell battery, the shaft rotates, the rotating permanent magnets generate electric power in the first coil, and
   2) both the second P channel FET and the second N channel FET are turned off, so that electrons flow from the first terminal of the first coil to the first terminal of the second coil and circulate in the coils, and
   wherein the routine B is repeated as the second permanent magnet and the third permanent magnet face the sides of the second coil and also as the fourth permanent magnet and the first permanent magnet face the sides of the second coil.

Advantageous Effects

In the present invention, by using four permanent magnets and two coils and one secondary cell battery, it can be to rotate a shaft by a first coil and to generate electric power in a second coil simultaneously. Also, it can be to make electric current flow from the second coil to the first coil, and so to reduce the power consumption of the secondary cell battery. The present invention can be used in various areas such as electric cars, electric airplanes, electric boats, electric bicycles, drones, etc.

BEST MODE FOR CARRYING OUT THE INVENTION

Desirable embodiments of the present invention are described by way of examples with reference to the accompanying drawings.

Figure 1:
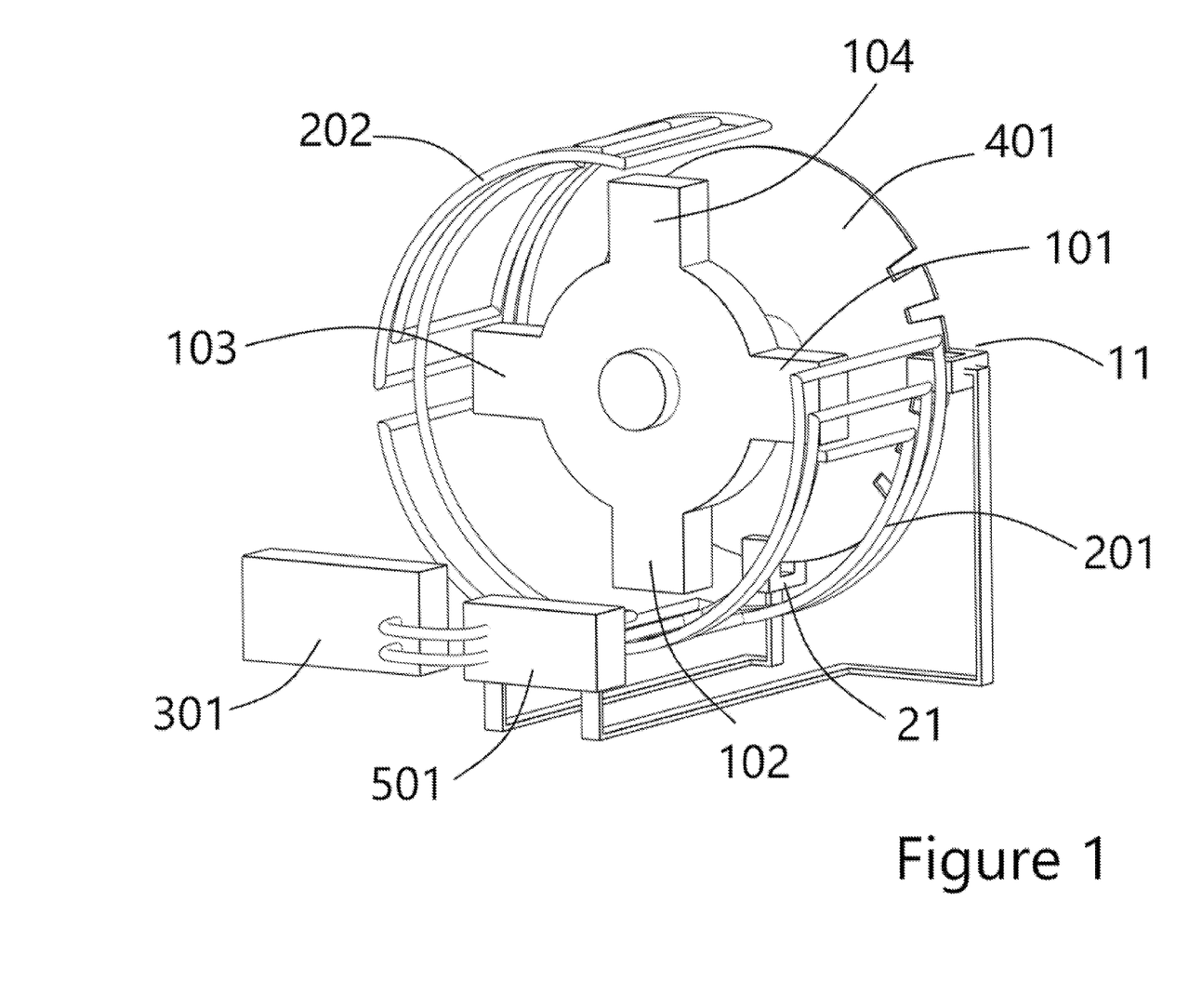
FIG. 1 is a perspective view that illustrates a configuration of an apparatus for operating simultaneously as DC motor and DC generator according to an embodiment of the present invention.

FIG. 1 is a perspective view that illustrates a configuration of an apparatus for operating simultaneously as DC motor and DC generator according to an embodiment of the present invention. As shown in FIG. 1, four permanent magnets are placed to be able to rotate with a shaft and the shaft is placed to be able to rotate with the unillustrated bearings. A first permanent magnet (101), a second permanent magnet (102), a third permanent magnet (103), a fourth permanent magnet (104) are placed with 90° of angular separation in which S poles of the first and the third permanent magnets (101, 103) face the shaft and N poles of the second and the fourth permanent magnets (102, 104) face the shaft.

Figure 3:
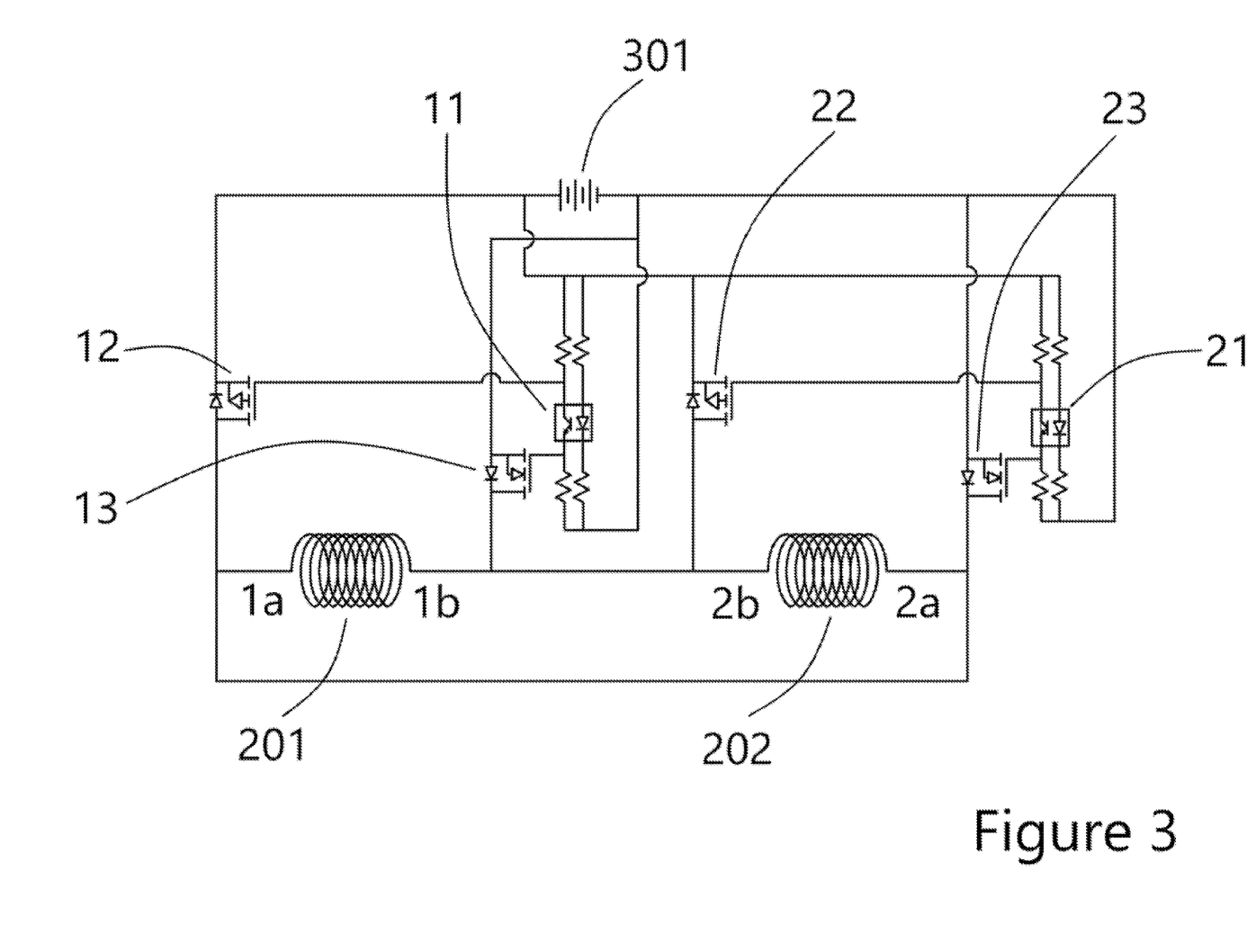
FIG. 3 is an electronic circuit of one device for making electric current flow in the coils. Two coils are connected.
Figure 4:
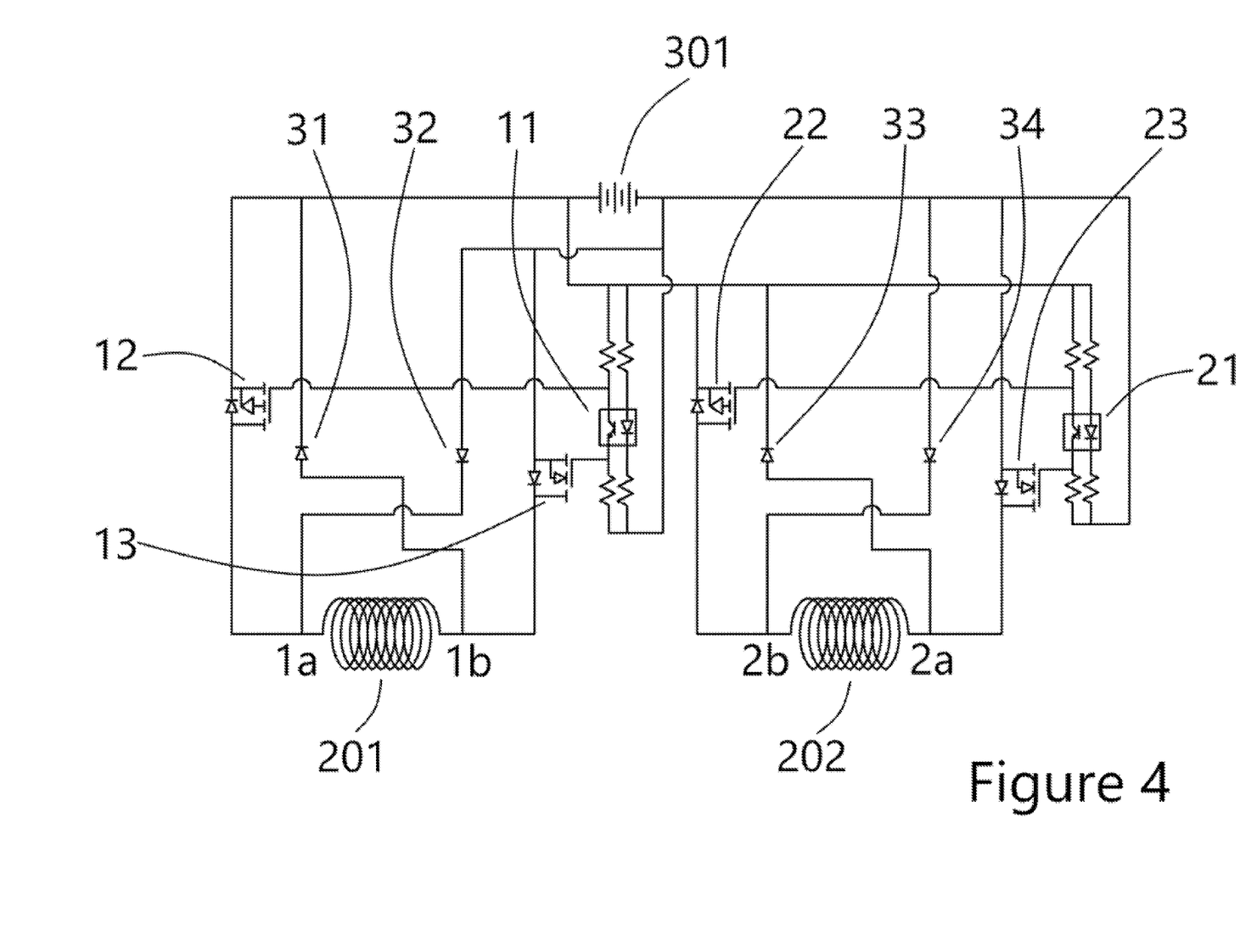
FIG. 4 is an electronic circuit of another device for making electric current flow in the coils. Two coils are not connected.
Figure 5:
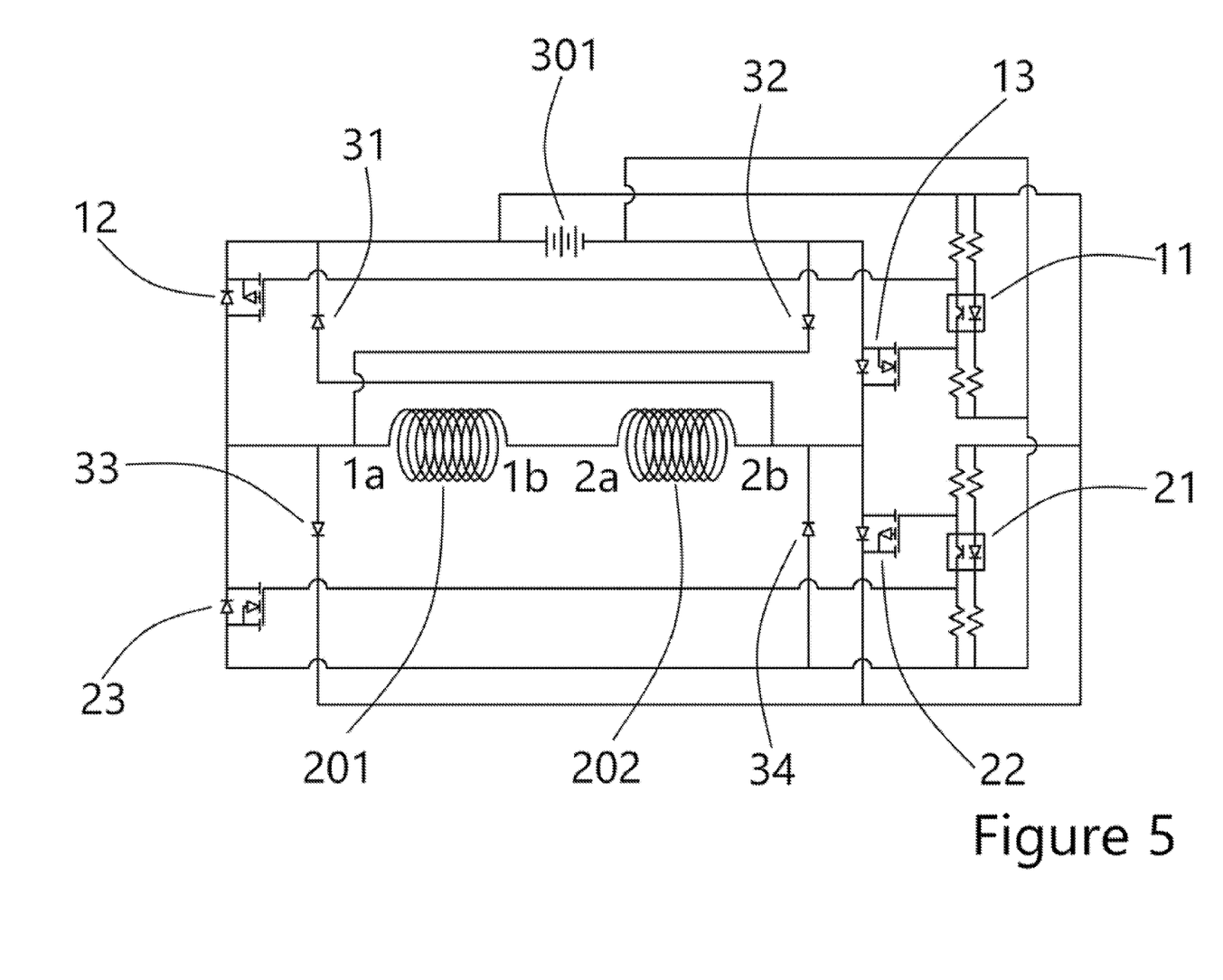
FIG. 5 is an electronic circuit of another device for making electric current flow in the coils. Two coils are connected and electric current flows in the coils simultaneously from a secondary cell battery.

Two coils are placed outside the circumference of the permanent magnets and the coils are fixed with the unillustrated fixing means. One side of a first coil (201) faces the first permanent magnet (101), another side of the first coil faces the second permanent magnet (102), one side of a second coil (202) faces the third permanent magnet (103), and another side of the second coil faces the fourth permanent magnet (104). As shown in FIG. 3, a first terminal (1a) of the first coil and a first terminal (2a) of the second coil are connected. A second terminal (2b) of the second coil and a second terminal (1b) of the first coil are connected.

One secondary cell battery (301) is used to supply electric current to the coils.

As shown in FIG. 1, one rotating component (401) is placed on the shaft and is fixed with the unillustrated fixing means. One device (501) which implements photointerrupters and other electronic components is used to make electric current flow in the coils.

Figure 2:
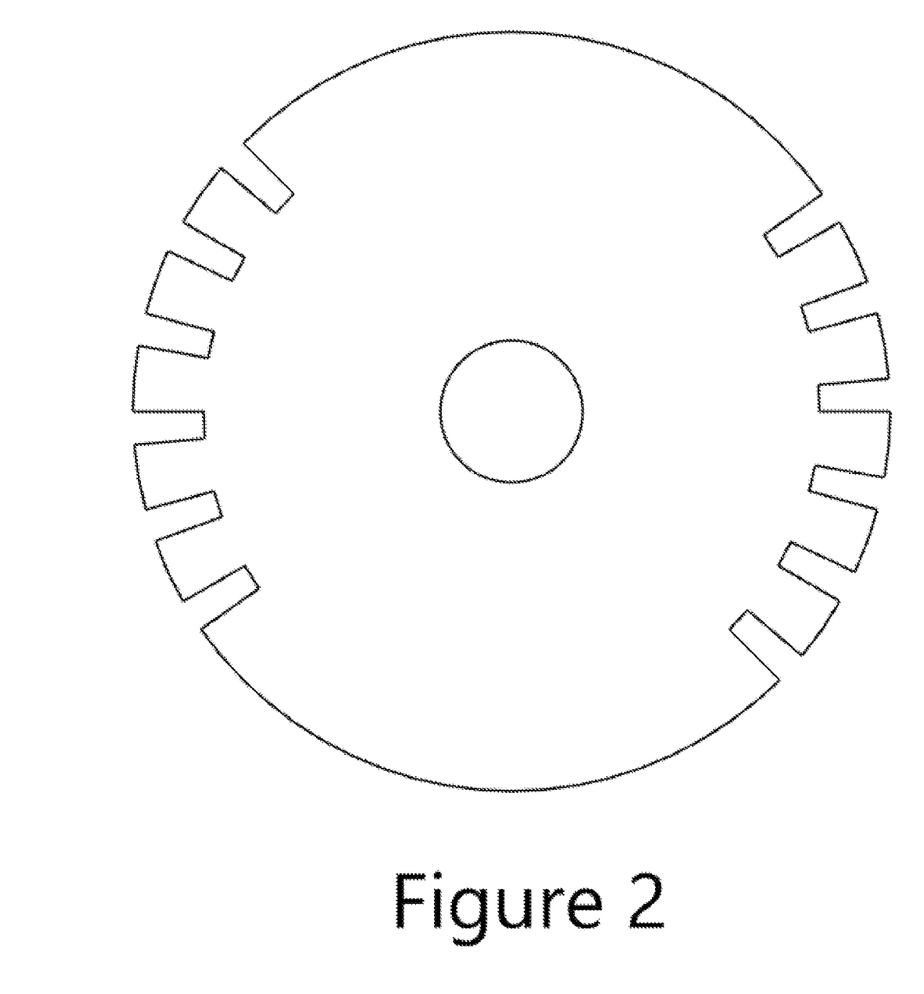
FIG. 2 is a drawing that illustrates a rotating component to be used for passing and blocking light of photointerrupters.

The rotating component passes light for 5° of angular separation and blocks light for 10° of angular separation and this process is repeated 6 times and then blocks light for 90° of angular separation. Again, the rotating component passes light for 5° of angular separation and blocks light for 10° of angular separation and this process is repeated 6 times and then blocks light for 90° of angular separation.

The rotating component is used to connect the positive terminal of the secondary cell battery to the first terminal of the first coil and disconnect them, and is used to connect the negative terminal of the secondary cell battery to the second terminal of the first coil and disconnect them, and is used to connect the positive terminal of the secondary cell battery to the second terminal of the second coil and disconnect them, and is used to connect the negative terminal of the secondary cell battery to the first terminal of the second coil and disconnect them.

A first photointerrupter (11) is set to pass the light of the first photointerrupter by the rotating component as the first permanent magnet and the second permanent magnet start to face the first coil and also as the third permanent magnet and the fourth permanent magnet start to face the first coil.

A second photointerrupter (21) is set to pass the light of the second photointerrupter by the rotating component as the second permanent magnet and the third permanent magnet start to face the second coil and also as the fourth permanent magnet and the first permanent magnet start to face the second coil.

A device (501) makes electric current flow in the first coil and the second coil alternately. As shown in FIG. 1, if the first permanent magnet and the second permanent magnet face the first coil, then the light of the first photointerrupter (11) is passed through, the first P channel FET (12) and the first N channel FET (13) become ON, electrons flow from the negative terminal of the secondary cell battery to the positive terminal of the secondary cell battery, the first coil activates, and the shaft rotates. The rotating permanent magnets generate electric power in the second coil. Then after a while if the light of the first photointerrupter is blocked, then the first P channel FET and the first N channel FET become OFF and electrons do not flow from the negative terminal of the secondary cell battery to the positive terminal of the secondary cell battery. At this time, electrons flow from the second terminal of the second coil to the second terminal of the first coil and flow from the first terminal of the first coil to the first terminal of the second coil. The above routine is repeated 6 times as the first permanent magnet and the second permanent magnet face the first coil.

If the second permanent magnet and the third permanent magnet face the second coil, then the light of the second photointerrupter (21) is passed through, the second P channel FET (22) and the second N channel FET (23) become ON, electrons flow from the negative terminal of the secondary cell battery to the positive terminal of the secondary cell battery and the second coil activates, and the shaft rotates. The rotating permanent magnets generate electric power in the first coil. Then after a while if the light of the second photointerrupter is blocked, then the second P channel FET and the second N channel FET become OFF and electrons do not flow from the negative terminal of the secondary cell battery to the positive terminal of the secondary cell battery. At this time, electrons flow from the first terminal of the first coil to the first terminal of the second coil and flow from the second terminal of the second coil to the second terminal of the first coil. The above routine is repeated 6 times as the second permanent magnet and the third permanent magnet face the second coil.

The shaft rotates 90° as the first permanent magnet and the second permanent magnet face the first coil, the shaft rotates 90° as the second permanent magnet and the third permanent magnet face the second coil, the shaft rotates 90° as the third permanent magnet and the fourth permanent magnet face the first coil, and the shaft rotates 90° as the fourth permanent magnet and the first permanent magnet face the second coil.

Namely, by using one secondary cell battery and making electric current flow to the coils alternately, permanent magnets rotate continuously, the rotating permanent magnets generate electric power in the coils. The generated electric current flows from one coil to another coil. Electric current always flows in one direction in the coils as the shaft rotates in one direction. If the direction of electric current in the coils is changed, the rotational direction of the shaft is changed.

Other example of the present invention is that eight permanent magnets and four coils are placed in the above example. Eight permanent magnets are placed to be able to rotate with the shaft. The first permanent magnet, the second permanent magnet, the third permanent magnet, the fourth permanent magnet, a fifth permanent magnet, a sixth permanent magnet, a seventh permanent magnet, and an eighth permanent magnet are placed in order by 45° of angular separation, and the permanent magnets are placed in alternating polarity.

Four coils are placed outside the circumference of the permanent magnets. One side of a first coil A faces the first permanent magnet, another side of the first coil A faces the second permanent magnet, one side of a second coil A faces the third permanent magnet, another side of the second coil A faces the fourth permanent magnet, one side of a first coil B faces the fifth permanent magnet, another side of the first coil B faces the sixth permanent magnet, one side of a second coil B faces the seventh permanent magnet, another side of the second coil B faces the eighth permanent magnet, the first coil A and the first coil B are connected in serial and the coils are considered as the first coil, the second coil A and the second coil B are connected in serial and the coils are considered as the second coil.

The first P channel FET and the first N channel FET are configured to be set to turn-on to make electric current flow in the first coil at a position where the first permanent magnet and the second permanent magnet start to face the sides of the first coil, and also where the third permanent magnet and the fourth permanent magnet start to face the sides of the first coil. The second P channel FET and the second N channel FET are configured to be set to turn-on to make electric current flow in the second coil at a position where the second permanent magnet and the third permanent magnet start to face the sides of the second coil, and also where the fourth permanent magnet and the fifth permanent magnet start to face the sides of the second coil.

Figure 6:
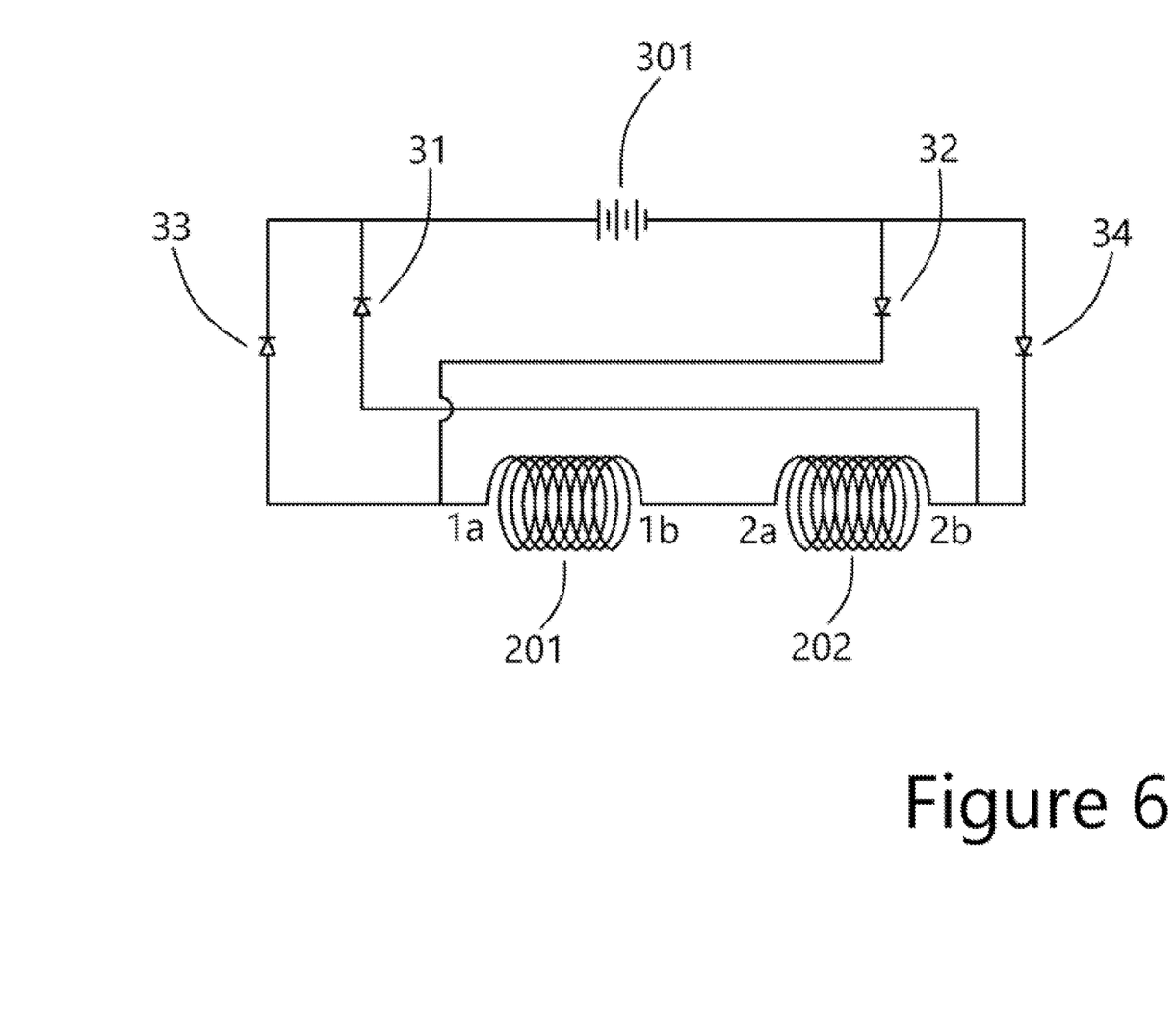
FIG. 6 is an electronic circuit of one device for generating electric power in the coils.

FIG. 6 is an electronic circuit of one device for generating electric power in the coils. The first terminal ($1a$) of the first coil is not connected to the first terminal ($2a$) of the second coil, the second terminal ($2b$) of the second coil is not connected to the second terminal ($1b$) of the first coil, and the second terminal ($1b$) of the first coil is connected to the first terminal ($2a$) of the second coil. A cathode of a first diode (31) is connected to the positive terminal of the secondary cell battery and an anode of the first diode is connected to the second terminal ($2b$) of the second coil, a cathode of a second diode (32) is connected to the first terminal ($1a$) of the first coil and an anode of the second diode is connected to the negative terminal of the secondary cell battery, a cathode of a third diode (33) is connected to the positive terminal of the secondary cell battery and an anode of the third diode is connected to the first terminal ($1a$) of the first coil, a cathode of a fourth diode (34) is connected to the second terminal ($2b$) of the second coil and an anode of the fourth diode is connected to the negative terminal of the secondary cell battery.

The rotating component is not comprised and the device for making electric current flow in the coils is not comprised. If the shaft rotates 90°, electric power is generated in the coils by the rotating permanent magnets, electrons flow from the first terminal ($1a$) of the first coil to the negative terminal of the secondary cell battery and flow from the positive terminal of the secondary cell battery to the second terminal ($2b$) of the second coil, and so the secondary cell battery is charged. If the shaft rotates 90° continuously, electric power is generated in the coils by the rotating permanent magnets, electrons flow from the second terminal ($2b$) of the second coil to the negative terminal of the secondary cell battery and flow from the positive terminal of the secondary cell battery to the first terminal ($1a$) of the first coil, and so the secondary cell battery is charged.

Figure 7:
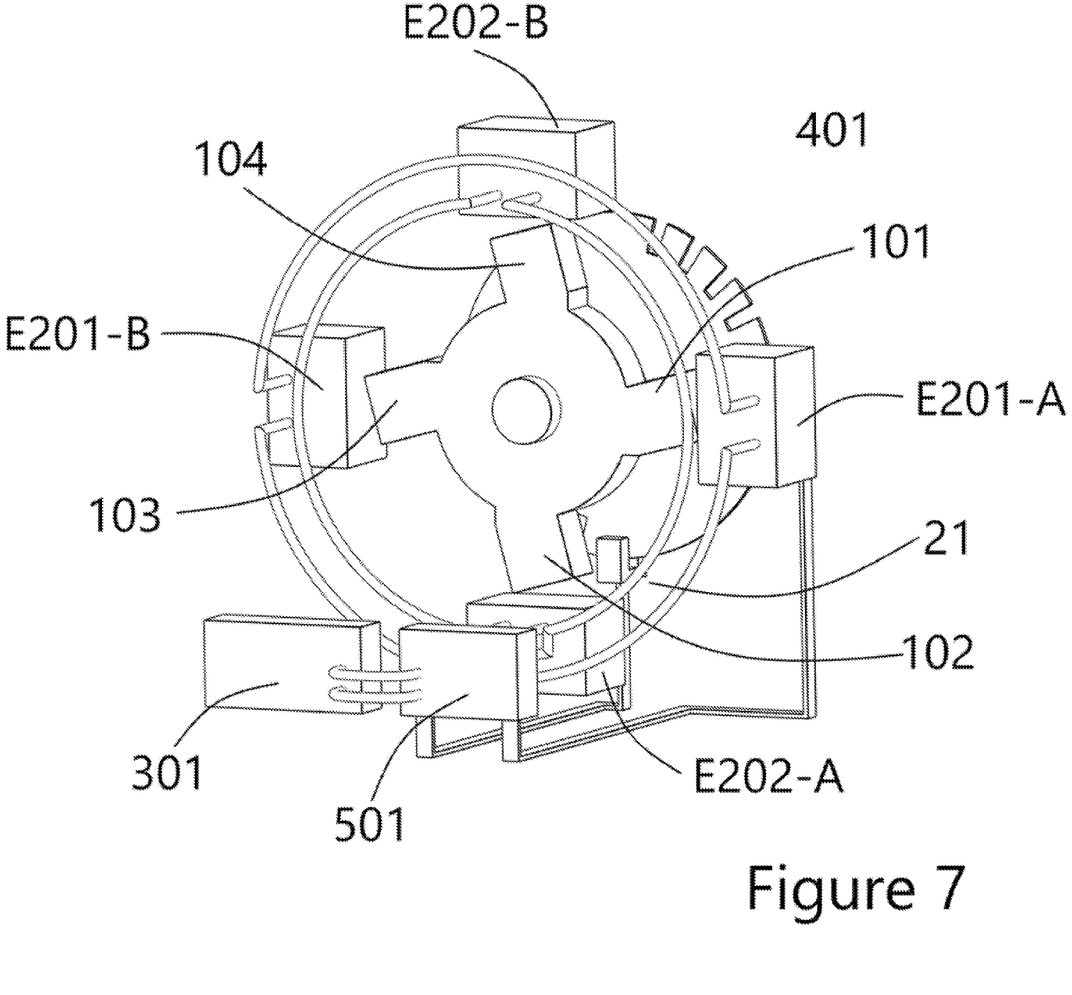
FIG. 7 is a perspective view that illustrates a configuration of another apparatus for operating simultaneously as DC motor and DC generator according to another embodiment of the present invention. Electromagnets are used instead of coils.
Figure 8:
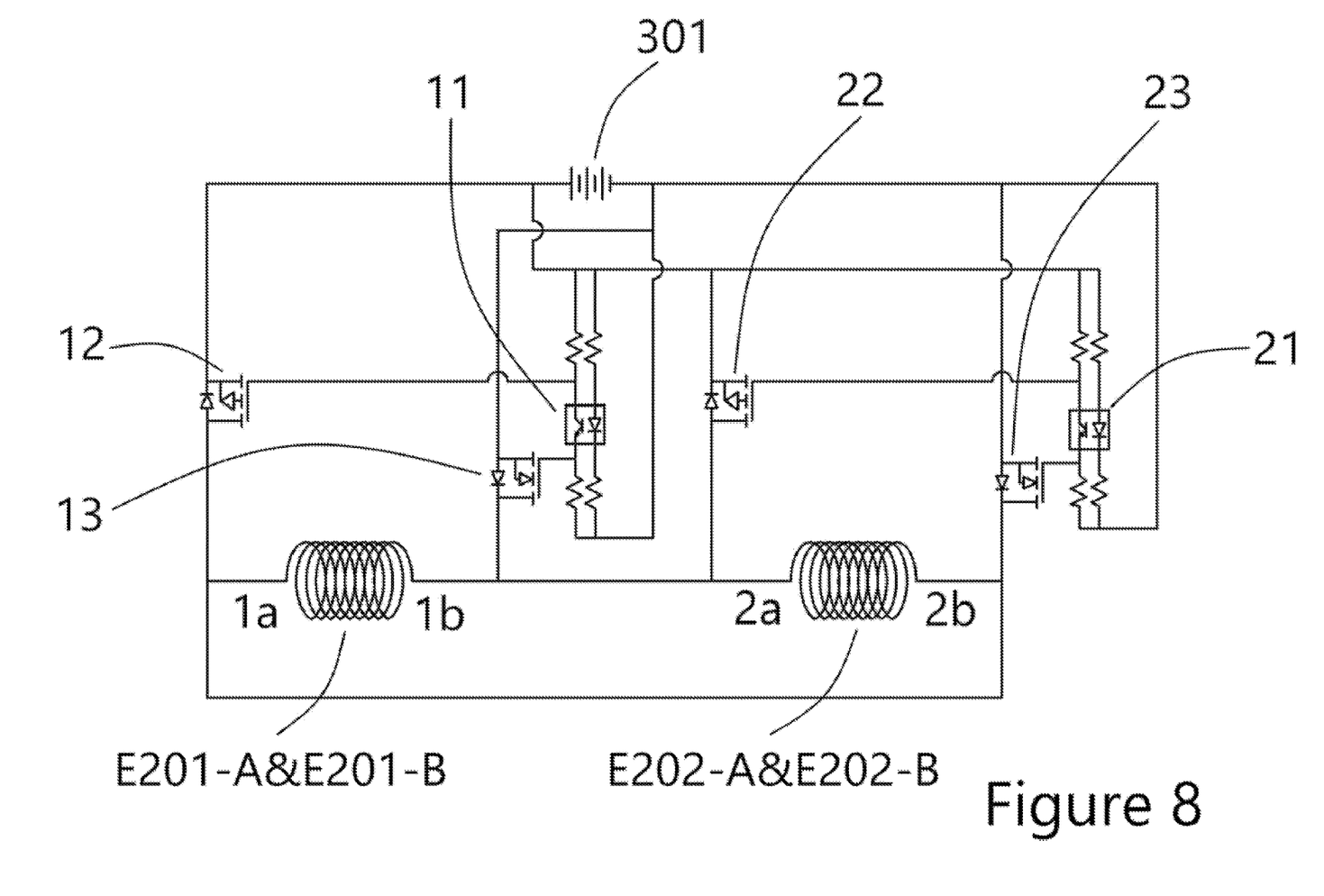
FIG. 8 is an electronic circuit of another device for making electric current flow in the coils. Four electromagnets are used in which two of them are connected and considered as one coil and the rest of them are connected and considered as another coil. The coils are connected.
Figure 9:
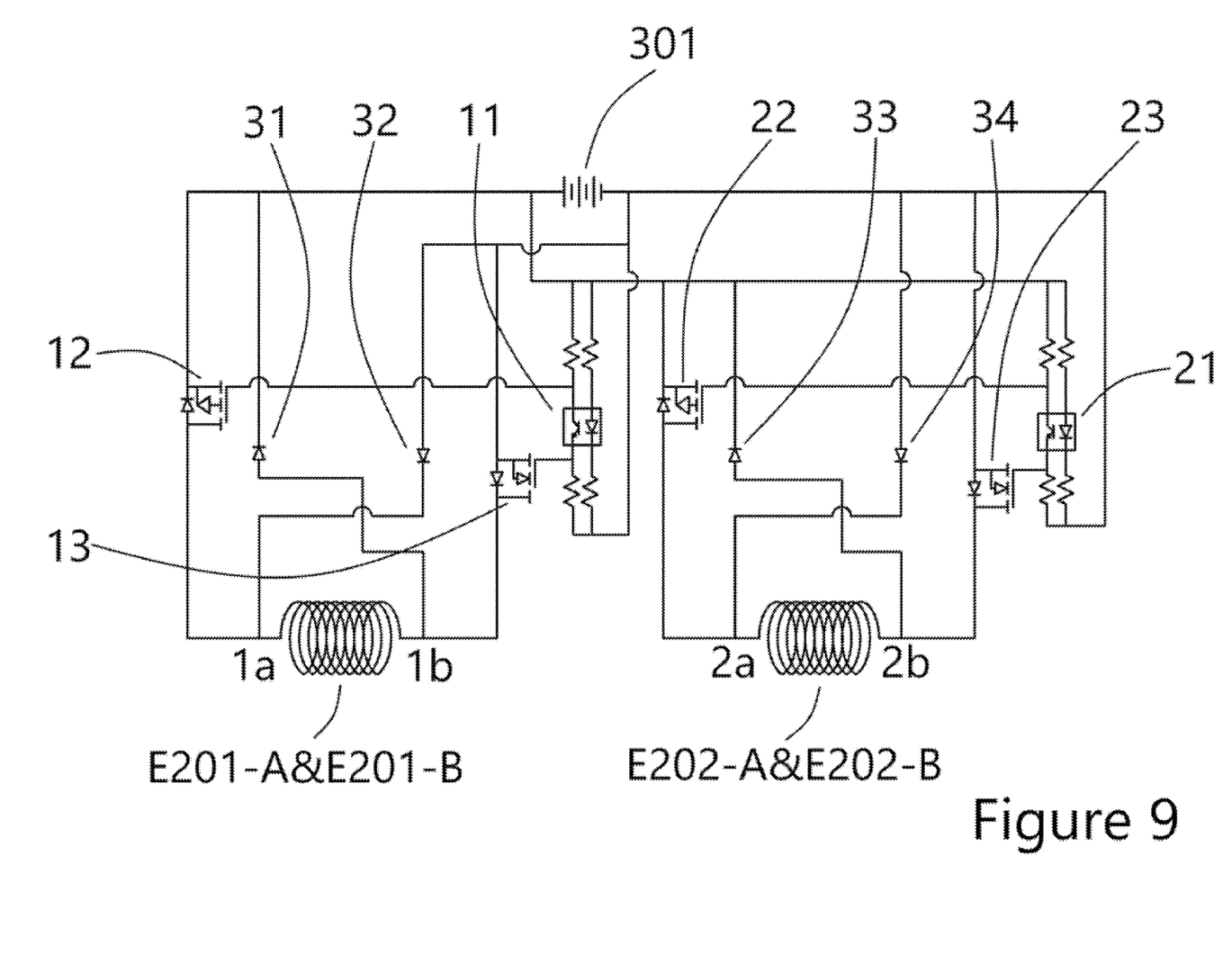
FIG. 9 is an electronic circuit of another device for making electric current flow in the coils. Four electromagnets are used in which two of them are connected and considered as one coil and the rest of them are connected and considered as another coil. The coils are not connected.
Figure 10:
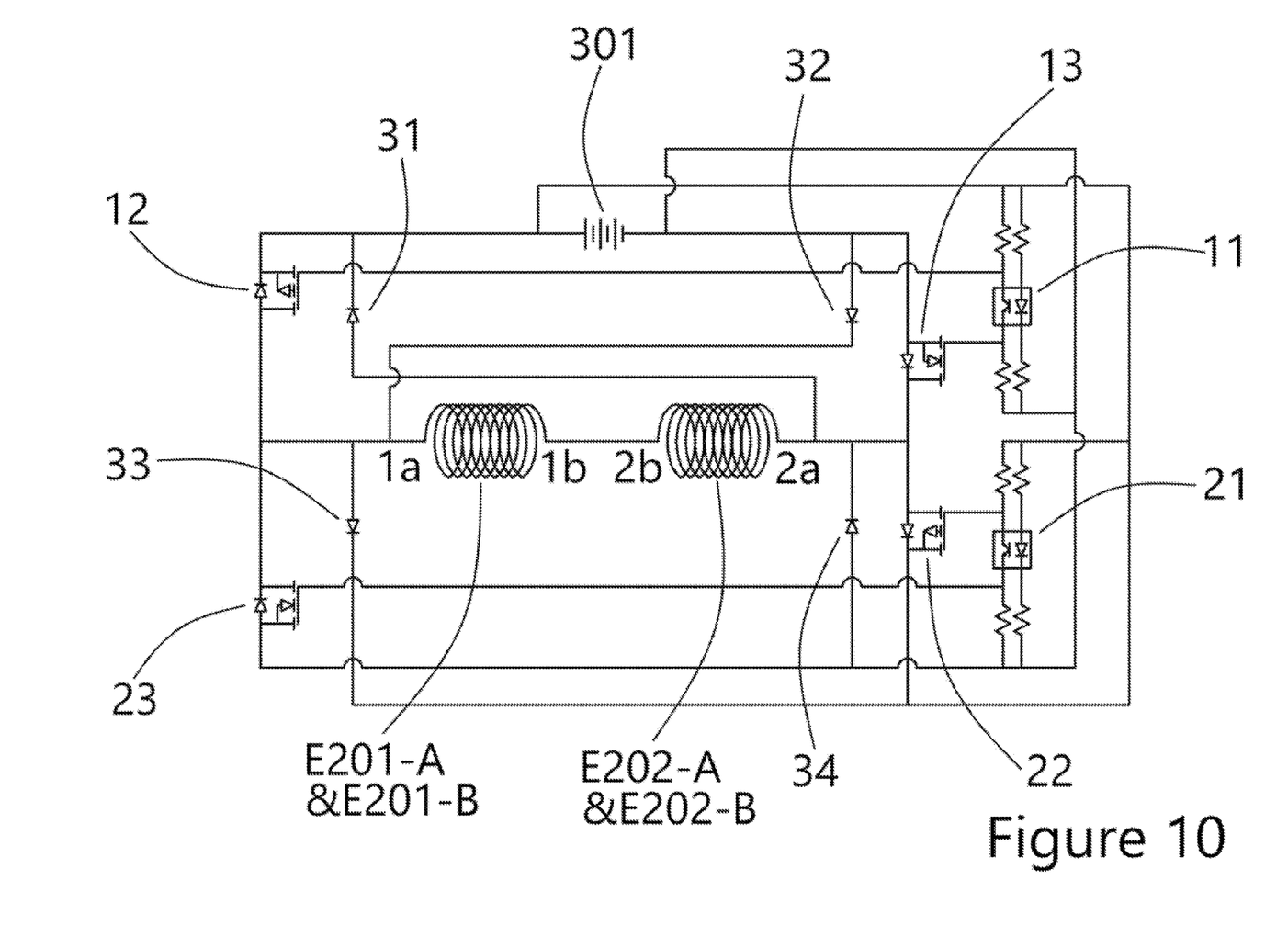
FIG. 10 is an electronic circuit of another device for making electric current flow in the coils. Four electromagnets are used in which two of them are connected and considered as one coil and the rest of them are connected and considered as another coil. The coils are connected and electric current flows in the coils simultaneously from a secondary cell battery.

FIG. 7 is a perspective view that illustrates a configuration of another apparatus for operating simultaneously as DC motor and DC generator according to another embodiment of the present invention. Electromagnets are used instead of coils. A first electromagnet A (E201-A) and a first electromagnet B (E201-B) are connected in serial and the connected electric wires are considered as the first coil, a second electromagnet A (E202-A) and a second electromagnet B (E202-B) are connected in serial and the connected electric wires are considered as the second coil. As shown in FIG. 8, the first terminal ($1a$) of the first coil and the second terminal ($2b$) of the second coil are connected. The first terminal ($2a$) of the second coil and the second terminal ($1b$) of the first coil are connected.

The present invention is not limited to the embodiments of the present invention that are described herein and it should be clear to those who have general knowledge in the technical area related to the present invention that various changes can be made without departing from the scope of the technical thoughts of the present invention.

What is claimed is:

1. An apparatus for operating simultaneously as DC (direct current) motor and DC generator, comprising:
   four permanent magnets which are placed to be able to rotate with a shaft wherein a first permanent magnet (101), a second permanent magnet (102), a third permanent magnet (103), and a fourth permanent magnet (104) are placed in order by 90° of angular separation, and the permanent magnets are placed in alternating polarity;
   wherein
   two coils which are placed outside the circumference of the permanent magnets wherein one side of a first coil (201) faces the first permanent magnet, another side of the first coil faces the second permanent magnet, one side of a second coil (202) faces the third permanent magnet, another side of the second coil faces the fourth permanent magnet, the coils are wound in the same way and placed in the same way, a first terminal ($1a$) of the first coil is connected to a first terminal ($2a$) of the second coil and a second terminal ($2b$) of the second coil is connected to a second terminal ($1b$) of the first coil;
   one secondary cell battery (301) which is used to supply electric current to the coils;
   a rotating component (401) which is placed on the shaft and is configured to repeatedly pass and block light of photointerrupters (11, 21);
   a device (501) for making electric current flow in the coils, wherein the positive terminal of the secondary cell battery and the first terminal (1a) of the first coil are connected by a first P channel FET (12), the second terminal (1b) of the first coil and the negative terminal of the secondary cell battery are connected by a first N channel FET (13), the positive terminal of the secondary cell battery and the second terminal (2b) of the second coil are connected by a second P channel FET (22), the first terminal (2a) of the second coil and the negative terminal of the secondary cell battery are connected by a second N channel FET (23), wherein a FET is configured to be set to turn-on as the light of a photointerrupter is passed and the FET is configured to be set to turn-off as the light of the photointerrupter is blocked, wherein the first P channel FET and the first N channel FET are configured to be set to turn-on to make electric current flow in the first coil at a position where the first permanent magnet and the second permanent magnet start to face the sides of the first coil and also where the third permanent magnet and the fourth permanent magnet start to face the sides of the first coil, wherein the second P channel FET and the second N channel FET are configured to be set to turn-on to make electric current flow in the second coil at a position where the second permanent magnet and the third permanent magnet start to face the sides of the second coil and also where the fourth permanent magnet and the first permanent magnet start to face the sides of the second coil, wherein the following routines A and B are alternately performed as the rotating component rotates, routine A: 1) both the first P channel FET and the first N channel FET are turned on, so that the first coil (201) is activated by the secondary cell battery, the shaft rotates, the rotating permanent magnets generate electric power in the second coil (202), and 2) both the first P channel FET and the first N channel FET are turned off, so that electrons flow from the second terminal (2b) of the second coil to the second terminal (1b) of the first coil and circulate in the coils, and wherein the routine A is performed as the first permanent magnet and the second permanent magnet face the sides of the first coil and also as the third permanent magnet and the fourth permanent magnet face the sides of the first coil, and routine B: 1) both the second P channel FET and the second N channel FET are turned on, so that the second coil (202) is activated by the secondary cell battery, the shaft rotates, the rotating permanent magnets generate electric power in the first coil (201), and 2) both the second P channel FET and the second N channel FET are turned off, so that electrons flow from the first terminal (1a) of the first coil to the first terminal (2a) of the second coil and circulate in the coils, and wherein the routine B is performed as the second permanent magnet and the third permanent magnet face the sides of the second coil and also as the fourth permanent magnet and the first permanent magnet face the sides of the second coil.

2. The apparatus as claimed in claim 1, the first terminal (1a) of the first coil is not connected to the first terminal (2a) of the second coil and the second terminal (2b) of the second coil is not connected to the second terminal (1b) of the first coil, and a cathode of a first diode (31) is connected to the positive terminal of the secondary cell battery and an anode of the first diode is connected to the second terminal (1b) of the first coil, a cathode of a second diode (32) is connected to the first terminal (1a) of the first coil and an anode of the second diode is connected to the negative terminal of the secondary cell battery, a cathode of a third diode (33) is connected to the positive terminal of the secondary cell battery and an anode of the third diode is connected to the first terminal (2a) of the second coil, a cathode of a fourth diode (34) is connected to the second terminal (2b) of the second coil and an anode of the fourth diode is connected to the negative terminal of the secondary cell battery;

in the device for making electric current flow in the coils, routine A: 1) both the first P channel FET and the first N channel FET are turned on, so that the first coil (201) is activated by the secondary cell battery, the shaft rotates, the rotating permanent magnets generate electric power in the second coil (202), electrons flow from the positive terminal of the secondary cell battery to the first terminal (2a) of the second coil and also flow from the second terminal (2b) of the second coil to the negative terminal of the secondary cell battery, and 2) both the first P channel FET and the first N channel FET are turned off, so that electrons flow from the positive terminal of the secondary cell battery to the second terminal (1b) of the first coil and also flow from the first terminal (1a) of the first coil to the negative terminal of the secondary cell battery by back-emf which occurs to the first coil, and routine B: 1) both the second P channel FET and the second N channel FET are turned on, so that the second coil (202) is activated by the secondary cell battery, the shaft rotates, the rotating permanent magnets generate electric power in the first coil (201), electrons flow from the positive terminal of the secondary cell battery to the second terminal (1b) of the first coil and also flow from the first terminal (1a) of the first coil to the negative terminal of the secondary cell battery, and 2) both the second P channel FET and the second N channel FET are turned off, so that electrons flow from the positive terminal of the secondary cell battery to the first terminal (2a) of the second coil and also flow from the second terminal (2b) of the second coil to the negative terminal of the secondary cell battery by back-emf which occurs to the second coil.

3. The apparatus as claimed in claim 1, eight permanent magnets which are placed to be able to rotate with the shaft wherein the first permanent magnet, the second permanent magnet, the third permanent magnet, the fourth permanent magnet, a fifth permanent magnet, a sixth permanent magnet, a seventh permanent magnet, and an eighth permanent magnet are placed in order by 45° of angular separation, and the permanent magnets are placed in alternating polarity;

four coils which are placed outside the circumference of the permanent magnets wherein one side of a first coil A faces the first permanent magnet, another side of the first coil A faces the second permanent magnet, one side of a second coil A faces the third permanent magnet, another side of the second coil A faces the fourth permanent magnet, one side of a first coil B faces the fifth permanent magnet, another side of the first coil B faces the sixth permanent magnet, one side of a second coil B faces the seventh permanent magnet, another side of the second coil B faces the eighth permanent magnet, the first coil A and the first coil B are connected in serial and the coils are considered as the first coil, the second coil A and the second coil B are connected in serial and the coils are considered as the second coil;
in the device for making electric current flow in the coils,
wherein the second P channel FET and the second N channel FET are configured to be set to turn-on to make electric current flow in the second coil at a position where the second permanent magnet and the third permanent magnet start to face the sides of the second coil, and also where the fourth permanent magnet and the fifth permanent magnet start to face the sides of the second coil, and
wherein the routine B is performed as the second permanent magnet and the third permanent magnet face the sides of the second coil and also as the fourth permanent magnet and the fifth permanent magnet face the sides of the second coil.

4. The apparatus as claimed in claim 1,
the first terminal (1a) of the first coil is not connected to the first terminal (2a) of the second coil, the second terminal (2b) of the second coil is not connected to the second terminal (1b) of the first coil, and the second terminal (1b) of the first coil is connected to the first terminal (2a) of the second coil, and
a cathode of a first diode (31) is connected to the positive terminal of the secondary cell battery and an anode of the first diode is connected to the second terminal (2b) of the second coil, a cathode of a second diode (32) is connected to the first terminal (1a) of the first coil and an anode of the second diode is connected to the negative terminal of the secondary cell battery, a cathode of a third diode (33) is connected to the positive terminal of the secondary cell battery and an anode of the third diode is connected to the first terminal (1a) of the first coil, a cathode of a fourth diode (34) is connected to the second terminal (2b) of the second coil and an anode of the fourth diode is connected to the negative terminal of the secondary cell battery;
in the device for making electric current flow in the coils,
wherein the positive terminal of the secondary cell battery and the first terminal (1a) of the first coil are connected by the first P channel FET, the second terminal (2b) of the second coil and the negative terminal of the secondary cell battery are connected by the first N channel FET, the positive terminal of the secondary cell battery and the second terminal (2b) of the second coil are connected by the second P channel FET, the first terminal (1a) of the first coil and the negative terminal of the secondary cell battery are connected by the second N channel FET,
wherein the first P channel FET and the first N channel FET are configured to be set to turn-on to make electric current flow in the coils at a position where the first permanent magnet and the second permanent magnet start to face the sides of the first coil and also where the third permanent magnet and the fourth permanent magnet start to face the sides of the first coil,
wherein the second P channel FET and the second N channel FET are configured to be set to turn-on to make electric current flow in the coils at a position where the second permanent magnet and the third permanent magnet start to face the sides of the second coil and also where the fourth permanent magnet and the first permanent magnet start to face the sides of the second coil,
routine A: 1) both the first P channel FET and the first N channel FET are turned on, so that the coils are activated by the secondary cell battery and the shaft rotates, and 2) both the first P channel FET and the first N channel FET are turned off, so that electrons flow from the positive terminal of the secondary cell battery to the second terminal (2b) of the second coil and also flow from the first terminal (1a) of the first coil to the negative terminal of the secondary cell battery by back-emf which occurs to the coils, and
routine B: 1) both the second P channel FET and the second N channel FET are turned on, so that the coils are activated by the secondary cell battery and the shaft rotates, and 2) both the second P channel FET and the second N channel FET are turned off, so that electrons flow from the positive terminal of the secondary cell battery to the first terminal (1a) of the first coil and also flow from the second terminal (2b) of the second coil to the negative terminal of the secondary cell battery by back-emf which occurs to the coils.

5. The apparatus as claimed in claim 1,
the first terminal (1a) of the first coil is not connected to the first terminal (2a) of the second coil, the second terminal (2b) of the second coil is not connected to the second terminal (1b) of the first coil, and the second terminal (1b) of the first coil is connected to the first terminal (2a) of the second coil, and
a cathode of a first diode (31) is connected to the positive terminal of the secondary cell battery and an anode of the first diode is connected to the second terminal (2b) of the second coil, a cathode of a second diode (32) is connected to the first terminal (1a) of the first coil and an anode of the second diode is connected to the negative terminal of the secondary cell battery, a cathode of a third diode (33) is connected to the positive terminal of the secondary cell battery and an anode of the third diode is connected to the first terminal (1a) of the first coil, a cathode of a fourth diode (34) is connected to the second terminal (2b) of the second coil and an anode of the fourth diode is connected to the negative terminal of the secondary cell battery;
the rotating component is not comprised;
the device for making electric current flow in the coils is not comprised;
if the shaft rotates 90°, electric power is generated in the coils by the rotating permanent magnets, electrons flow from the first terminal (1a) of the first coil to the negative terminal of the secondary cell battery and flow from the positive terminal of the secondary cell battery to the second terminal (2b) of the second coil, and so the secondary cell battery is charged, and
if the shaft rotates 90° continuously, electric power is generated in the coils by the rotating permanent magnets, electrons flow from the second terminal (2b) of the second coil to the negative terminal of the secondary cell battery and flow from the positive terminal of the secondary cell battery to the first terminal (1a) of the first coil, and so the secondary cell battery is charged.

6. The apparatus as claimed in claim 1,
instead of two coils, four electromagnets which are placed outside the circumference of the permanent magnets wherein a first electromagnet A (E201-A) faces the first permanent magnet, a second electromagnet A (E202-A) faces the second permanent magnet, a first electromagnet B (E201-B) faces the third permanent magnet, a second electromagnet B (E202-B) faces the fourth permanent magnet, the first electromagnet A and the first electromagnet B are connected in serial and the connected electric wires are considered as the first coil, the second electromagnet A and the second electromagnet B are connected in serial and the connected electric wires are considered as the second coil, and the first terminal (1a) of the first coil is connected to the second terminal (2b) of the second coil and the first terminal (2a) of the second coil is connected to the second terminal (1b) of the first coil;

in the device for making electric current flow in the coils, wherein the positive terminal of the secondary cell battery and the first terminal (2a) of the second coil are connected by the second P channel FET, the second terminal (2b) of the second coil and the negative terminal of the secondary cell battery are connected by the second N channel FET, wherein the first P channel FET and the first N channel FET are configured to be set to turn-on to make electric current flow in the first coil at a position where the first permanent magnet and the third permanent magnet face the first electromagnet A and the first electromagnet B, wherein the second P channel FET and the second N channel FET are configured to be set to turn-on to make electric current flow in the second coil at a position where the first permanent magnet and the third permanent magnet face the second electromagnet A and the second electromagnet B, routine A: 1) both the first P channel FET and the first N channel FET are turned on, so that the first coil (201) is activated by the secondary cell battery, the shaft rotates, the rotating permanent magnets generate electric power in the second coil (202), and 2) both the first P channel FET and the first N channel FET are turned off, so that electrons flow from the first terminal (2a) of the second coil to the second terminal (1b) of the first coil and circulate in the coils, and wherein the routine A is performed as the first permanent magnet and the third permanent magnet face the first electromagnet A and the first electromagnet B, and routine B: 1) both the second P channel FET and the second N channel FET are turned on, so that the second coil (202) is activated by the secondary cell battery, the shaft rotates, the rotating permanent magnets generate electric power in the first coil (201), and 2) both the second P channel FET and the second N channel FET are turned off, so that electrons flow from the first terminal (1a) of the first coil to the second terminal (2b) of the second coil and circulate in the coils, and wherein the routine B is performed as the first permanent magnet and the third permanent magnet face the second electromagnet A and the second electromagnet B.

7. The apparatus as claimed in claim 1, instead of two coils, four electromagnets which are placed outside the circumference of the permanent magnets wherein a first electromagnet A (E201-A) faces the first permanent magnet, a second electromagnet A (E202-A) faces the second permanent magnet, a first electromagnet B (E201-B) faces the third permanent magnet, a second electromagnet B (E202-B) faces the fourth permanent magnet, the first electromagnet A and the first electromagnet B are connected in serial and the connected electric wires are considered as the first coil, the second electromagnet A and the second electromagnet B are connected in serial and the connected electric wires are considered as the second coil, and the first terminal (1a) of the first coil is not connected to the first terminal (2a) of the second coil and the second terminal (2b) of the second coil is not connected to the second terminal (1b) of the first coil, and a cathode of a first diode (31) is connected to the positive terminal of the secondary cell battery and an anode of the first diode is connected to the second terminal (1b) of the first coil, a cathode of a second diode (32) is connected to the first terminal (1a) of the first coil and an anode of the second diode is connected to the negative terminal of the secondary cell battery, a cathode of a third diode (33) is connected to the positive terminal of the secondary cell battery and an anode of the third diode is connected to the second terminal (2b) of the second coil, a cathode of a fourth diode (34) is connected to the first terminal (2a) of the second coil and an anode of the fourth diode is connected to the negative terminal of the secondary cell battery;

in the device for making electric current flow in the coils, wherein the positive terminal of the secondary cell battery and the first terminal (2a) of the second coil are connected by the second P channel FET, the second terminal (2b) of the second coil and the negative terminal of the secondary cell battery are connected by the second N channel FET, wherein the first P channel FET and the first N channel FET are configured to be set to turn-on to make electric current flow in the first coil at a position where the first permanent magnet and the third permanent magnet face the first electromagnet A and the first electromagnet B, wherein the second P channel FET and the second N channel FET are configured to be set to turn-on to make electric current flow in the second coil at a position where the first permanent magnet and the third permanent magnet face the second electromagnet A and the second electromagnet B, routine A: 1) both the first P channel FET and the first N channel FET are turned on, so that the first coil (201) is activated by the secondary cell battery, the shaft rotates, the rotating permanent magnets generate electric power in the second coil (202), electrons flow from the positive terminal of the secondary cell battery to the second terminal (2b) of the second coil and also flow from the first terminal (2a) of the second coil to the negative terminal of the secondary cell battery, and 2) both the first P channel FET and the first N channel FET are turned off, so that electrons flow from the positive terminal of the secondary cell battery to the second terminal (1b) of the first coil and also flow from the first terminal (1a) of the first coil to the negative terminal of the secondary cell battery by back-emf which occurs to the first coil, and wherein the routine A is performed as the first permanent magnet and the third permanent magnet face the first electromagnet A and the first electromagnet B, and routine B: 1) both the second P channel FET and the second N channel FET are turned on, so that the second coil (202) is activated by the secondary cell battery, the shaft rotates, the rotating permanent magnets generate electric power in the first coil (201), electrons flow from the positive terminal of the secondary cell battery to the second terminal (1b) of the first coil and also flow from the first terminal (1a) of the first coil to the negative terminal of the secondary cell battery, and 2) both the second P channel FET and the second N channel FET are turned off, so that electrons flow from the positive terminal of the secondary cell battery to the second terminal (2b) of the second coil and also flow from the first terminal (2a) of the second coil to the negative terminal of the secondary cell battery by back-emf which occurs to the second coil, and wherein the routine B is performed as the first permanent magnet and the third permanent magnet face the second electromagnet A and the second electromagnet B.

8. The apparatus as claimed in claim 1, instead of two coils, four electromagnets which are placed outside the circumference of the permanent magnets wherein a first electromagnet A (E201-A) faces the first permanent magnet, a second electromagnet A (E202-A) faces the second permanent magnet, a first electromagnet B (E201-B) faces the third permanent magnet, a second electromagnet B (E202-B) faces the fourth permanent magnet, the first electromagnet A and the first electromagnet B are connected in serial and the connected electric wires are considered as the first coil, the second electromagnet A and the second electromagnet B are connected in serial and the connected electric wires are considered as the second coil, and the first terminal (1*a*) of the first coil is not connected to the first terminal (2*a*) of the second coil, and a cathode of a first diode (31) is connected to the positive terminal of the secondary cell battery and an anode of the first diode is connected to the first terminal (2*a*) of the second coil, a cathode of a second diode (32) is connected to the first terminal (1*a*) of the first coil and an anode of the second diode is connected to the negative terminal of the secondary cell battery, a cathode of a third diode (33) is connected to the positive terminal of the secondary cell battery and an anode of the third diode is connected to the first terminal (1*a*) of the first coil, a cathode of a fourth diode (34) is connected to the first terminal (2*a*) of the second coil and an anode of the fourth diode is connected to the negative terminal of the secondary cell battery;

in the device for making electric current flow in the coils, wherein the positive terminal of the secondary cell battery and the first terminal (1*a*) of the first coil are connected by the first P channel FET, the first terminal (2*a*) of the second coil and the negative terminal of the secondary cell battery are connected by the first N channel FET, the positive terminal of the secondary cell battery and the first terminal (2*a*) of the second coil are connected by the second P channel FET, the first terminal (1*a*) of the first coil and the negative terminal of the secondary cell battery are connected by the second N channel FET, wherein the first P channel FET and the first N channel FET are configured to be set to turn-on to make electric current flow in the coils at a position where the first permanent magnet and the third permanent magnet face the first electromagnet A and the first electromagnet B, wherein the second P channel FET and the second N channel FET are configured to be set to turn-on to make electric current flow in the coils at a position where the first permanent magnet and the third permanent magnet face the second electromagnet A and the second electromagnet B, routine A: 1) both the first P channel FET and the first N channel FET are turned on, so that the coils are activated by the secondary cell battery and the shaft rotates, and 2) both the first P channel FET and the first N channel FET are turned off, so that electrons flow from the positive terminal of the secondary cell battery to the first terminal (2*a*) of the second coil and also flow from the first terminal (1*a*) of the first coil to the negative terminal of the secondary cell battery by back-emf which occurs to the coils, and wherein the routine A is performed as the first permanent magnet and the third permanent magnet face the first electromagnet A and the first electromagnet B, and routine B: 1) both the second P channel FET and the second N channel FET are turned on, so that the coils are activated by the secondary cell battery and the shaft rotates, and 2) both the second P channel FET and the second N channel FET are turned off, so that electrons flow from the positive terminal of the secondary cell battery to the first terminal (1*a*) of the first coil and also flow from the first terminal (2*a*) of the second coil to the negative terminal of the secondary cell battery by back-emf which occurs to the coils, and wherein the routine B is performed as the first permanent magnet and the third permanent magnet face the second electromagnet A and the second electromagnet B.

* * * * *